Patented June 18, 1946

2,402,484

UNITED STATES PATENT OFFICE 2,402,484

CATALYTIC POLYMERIZATION OF UNSATURATED ESTERS

David E. Adelson, Berkeley, Calif., Robert P. Ruh, Columbus, Ohio, and Harold F. Gray, Jr., Berkeley, Calif., assignors to Shell Development Company, San Francisco, Calif., a corporation of Delaware No Drawing. Application June 14, 1943, Serial No. 490,952

15 Claims. (Cl. 260—80)

This invention relates to a process for the catalytic polymerization of unsaturated esters. More particularly, the invention pertains to polymerization of allyl esters and related compounds, the polymerization being effected catalytically by the presence of a new class of polymerization catalysts consisting of certain metal salts.

Unsaturated esters of the type of allyl acetate obtainable from a monocarboxylic acid which is devoid of any polymerizable unsaturated group and an unsaturated alcohol having an olefinic linkage between two carbon atoms one of which is directly linked to a saturated carbon atom having a hydroxyl group linked directly thereto, are compounds which may be termed difficultly polymerizable substances. While the action of heat, light or peroxidic substances has been used to obtain polymers from unsaturated esters of this type, none effects a rapid polymerization of the compounds and each of such catalysts is accompanied with certain disadvantages which are overcome by the present invention.

It is an object of the present invention to provide a method of polymerizing allyl acetate and related compounds.

Another object is to provide a process for obtaining polymers of unsaturated esters of the type of allyl acetate employing as catalytic agent therefor a class of metal salts.

A further object is to provide a class of new polymerization catalysts.

These and other objects will be apparent from the description of the invention given hereinafter.

We have now discovered that allyl acetate and related compounds are catalytically polymerized when heated in the presence of a cadmium or mercuric salt of a carboxylic acid. These compounds employed as catalyst are carboxylic acid salts of a bivalent metal of the group consisting of cadmium and mercury. Any carboxylic acid salt of these metals, wherein the cadmium or mercury is in a bivalent state of valency, is suitable as catalyst in the process of the invention. Representative salts include cadmium or mercuric formate, acetate, propionate, butyrate, chloracetate, isobutyrate, phthalate, malonate, succinate, maleate, valerate, palmitate, stearate, bromstearate, tartrate, malate, etc. These compounds are cadmium or mercuric salts of carboxylic acids containing no other elements than carbon, hydrogen, oxygen and halogen.

Preferably, salts of saturated monocarboxylic acids containing not more than 6 carbon atoms are employed. Cadmium acetate and mercuric acetate are the most preferred salts. The catalytic effect of these salts is evident from the results tabulated below which were obtained in polymerizing allyl acetate, a difficultly polymerizable ester, in their presence. The monomeric allyl acetate was substantially pure and anhydrous and to separate quantities was added 0.5% anhydrous cadmium acetate or mercuric acetate. The esters were refluxed or boiled at normal pressure in the presence of the salts in a vessel fitted with a reflux condenser and the course of the polymerization was followed by observation of the refractive index of the reaction mass taken from time to time after starting the heating. The refractive index of the polymer which was polyallyl acetate was considerably higher than that of the monomer so that an increase of refractive index indicated that polymerization was occurring. A blank to which no salt was added was similarly heated for comparison and the results of this experiment are also listed below. The values given in the body of the table are the increase in fourth decimal place units of the refractive index ($\Delta n20/D \times 10^4$) for the indicated time from start.

| Hours | Blank | Cadmium acetate | Mercuric acetate |
|---|---|---|---|
| 53 | | 18 | |
| 66 | 16 | | |
| 118 | 16 | | 32 |
| 161 | | 48 | |
| 169 | | | |
| 182 | 20 | | 42 |
| 273 | | 106 | |
| 279 | | | |
| 294 | 29 | | |
| 373 | | 148 | |
| 389 | | | 64 |
| 411 | 36 | | |
| 483 | | 187 | |
| 501 | | | 90 |
| 528 | 51 | | |
| 618 | | | 120 |
| 645 | 56 | | |
| 717 | 60 | | |
| 735 | | | 173 |
| Average rate of increase in units per hr | 0.108 | 0.370 | 0.189 |

The increase in refractive index is approximately proportional to the rate of polymer formation at the substantially uniform temperature employed and the results tabulated above indicate that while the heating of the allyl acetate in the absence of a catalyst slowly effects the polymerization of the ester, the rate of polymer formation is improved by the presence of the catalytically active salts.

The compounds polymerized according to the process of the invention are unsaturated esters of a monocarboxylic acid and the esters contain a single olefinic bond. Although the salts catalyze polymerization of any polymerizable unsaturated compound, the esters employed are those of a monocarboxylic acid devoid of any polymer-promoting group such as esters of acrylic acid, crotonic acid, cinnamic acid, etc. The esters are derived from a mono-unsaturated alcohol having an olefinic linkage between two carbon atoms one of which contains at least one hydrogen atom linked directly thereto and one of which is linked directly to a saturated carbon atom containing the hydroxyl group linked directly thereto. Preferably the ester is derived from a mono-unsaturated alcohol containing a vinylidene group directly linked to a saturated carbon atom to which is linked the hydroxyl group. Unsaturated esters of aromatic acids such as benzoic acid, toluic acid, and the like are included within the perview of the invention since the lack of saturation of the carbon atoms in the aromatic ring of such compounds is responsible for no polymerizable unsaturated groups therein because of the well-known peculiarities of aromatic nuclei. The esters of saturated monocarboxylic acids constitute a preferred group and while esters of simple saturated acids are particularly preferred, also included are those esters of saturated aliphatic acids wherein one or more hydrogen atoms have been substituted by a halogen atom, a hydroxyl group, an alkoxy group, and aryl oxy group and like groups. Among the preferred reactants are included such compounds as allyl formate, allyl acetate, allyl propionate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl propionate, allyl toluate, allyl salicylate, allyl glycolate, allyl methoxyacetate, beta-methylallyl chloracetate, allyl beta-chloropropionate, allyl lactate, allyl naphthenate, beta-methylallyl chlorobenzoate, allyl alpha-hydroxyisobutyrate, allylacetylglycolate allyl stearate, allyl levulinate, beta-methylallyl butryrate, alpha-methylallyl acetate, alpha-phenylallyl acetate, allyl ethoxyformate, beta-methylallyl phenoxyformate, allyl naphthoate, allyl ester of hydrogenated abietic acid, and the like.

The preferred compounds of the group may be represented by the general formula,

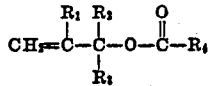

wherein $R_1$, $R_2$ and $R_3$ represent hydrogen atoms, halogen atoms or hydrocarbon radicals and $R_4$ represents a hydrogen atom or an organic radical devoid of a polymerizable unsaturated group, such as an alkyl group, an aryl group, an alicyclic group, an aralkyl group, an alkoxy group, an aryl oxy group, and the like.

Less preferred esters include compounds like crotyl acetate, crotyl propionate, crotyl benzoate, 2-hexenyl acetate, 2-pentenyl formate, 2-isopentenyl chloracetate, methyl isobutenyl carbinyl butyrate, and similar types of esters.

The polymerization is effected by heating the unsaturated ester under anhydrous conditions in the presence of or in contact with the catalyst salts at a temperature of 50 to 150° C. with the ester in the liquid phase. With unsaturated esters of sufficiently low melting point so that they are liquid under the reaction condition, the ester is polymerized in the process per se. The use of higher esters requires the use of an inert solvent in order to have the reaction mixture liquid in effecting the polymerization. For this purpose solvents such as saturated esters like ethyl acetate, isopropyl acetate, butyl acetate, etc.; hydrocarbons like benzene, toluene, hexane, octanes, etc.; ethers like dioxane, dibutyl ether, beta-dichlorodiethyl ether, etc., are admixed with the unsaturated ester subjected to polymerization. In general, however, it is preferred to avoid the use of solvents or diluents where possible since they complicate the recovery problem in obtaining the polymer and decrease the rate of the polymerization reactions. It is preferred to employ as reactant an unsaturated ester which is liquid under the reaction conditions as is realized with lower esters or esters of lower unsaturated alcohols. These preferred reactants contain not more than seven carbon atoms in the unsaturated ester.

While the salts employed as catalyst dissolve to a greater or lesser extent in the reaction material, they are normally soluble in only minute amounts so that the reaction mixture is contacted with the catalyst as a crystalline substance. For this reason its is preferable to utilize the salt in the finely divided or comminuted state. Amounts of catalyst from a few hundredths of 1% to 5% or more per cent are effective in catalyzing the reactions.

The cadmium or mercuric salts of the carboxylic acids which are employed as catalyst in polymerizing the unsaturated esters have advantages not realized with known catalyst such as benzoyl peroxide, one of the most commonly used materials for this purpose. Since they are essentially insoluble in the reaction mixture, the polymer obtained is not contaminated with materials such as benzoic acids and other decomposition products obtained when benzoyl peroxide is utilized. Further, upon completion of the polymerization operation, the catalyst is filtered from the reaction mixture and can be used again.

In extending the process of the invention the unsaturated ester to which had been added an amount of catalyst is heated between 50 and 150° C. and the heating continued until the desired degree of polymerization has occurred. The polymers of the unsaturated esters are linear polymers which are soluble generally in the monomeric material. After 25 to 35% or more of the reactant has been converted to polymer, as may be determined by observation of increase of the refractive index, the heating is discontinued and the reaction material filtered to remove catalyst. The filtered material is then subjected to distillation to separate unreacted monomer, the polymers remaining as residue. If desired, any trace of catalyst salt or other material retained by the polymer is removed by water-washing. It is usually desirable to choose a reactant which will boil within the range of reaction temperature whereby the polymerization is effected by refluxing the material in the presence of the catalyst. The presence or absence of oxygen appears to have no significant effect on the rate of the polymerization reaction when the catalysts of the present invention are employed. In some cases it is desirable to intermittently add fresh catalyst to the reaction material during the course of the heating rather than adding the entire amount at the start.

Another method of effecting the reaction which is adapted for continuous production of polymer realized with the catalyst salts is to pass the liquid reactant material through a bed of the salt. In adapting this procedure to continuous operation the organic material is circulated through a bed of the catalyst maintained at the desired temperature and monomeric ester is fed into the cycling system while material is withdrawn therefrom, the withdrawn portion being a mixture of polymer and monomer from which the monomer is recovered for return to the cycling system.

The polymers prepared according to the invention have application as plasticizers and softeners for various materials. Further, the solubility in various substances makes the polymeric esters useful intermediates in the synthesis of polymeric alcohols which may be prepared by hydrolysis or saponification of the polymers.

For the purpose of further illustrating the invention the following specific example is given, but it is to be understood that the invention is not to be construed as limited to any details given therein.

Example

A mixture of about 100 grams of allyl acetate and 0.5 gram of anhydrous cadmuim acetate was refluxed for 483 hours; a gain of 0.0187 unit in refractive index was observed. The catalyst was filtered off and 99.5 grams of the filtrate was distilled at 100° C. under 1 mm. pressure in a current of carbon dioxide gas in order to recover the unreacted monomer. The distillate consisted of about 64.5 grams of allyl acetate having a refractive index of $\Delta n20/D=1.4040$ or a recovery of about 72.1%. The polymeric residue amounted to about 24.8 grams indicating a conversion of 27.7% had been realized. The polyallyl acetate was a yellow viscous mass which analyzed as follows:

|  | Found | Calculated |
|---|---|---|
| Refractive index, 20/D | 1.4780 |  |
| Ester value, equiv. per 100 grams | 0.978 | 1.000 |
| Acidity, equiv. per 100 grams | 0.009 | 0.0 |
| Carbon, per cent | 58.7 | 60.0 |
| Hydrogen, per cent | 7.9 | 8.0 |
| Molecular weight: |  |  |
| Cryoscopic in acetic acid | 780 |  |
| Staudinger's method (C=0.05%) | 1,810 |  |
| Staudinger's method (C=1.4%) | 1,830 |  |

We claim as our invention:

1. A process for the production of polyallyl acetate which consists of boiling allyl acetate at atmospheric pressure under anhydrous and non-oxidizing conditions in the presence of cadmium acetate for a time sufficient to effect appreciable polymerization of the allyl acetate.

2. A process for the production of polyallyl acetate which consists of boiling allyl acetate at atmospheric pressure under anhydrous and non-oxidizing conditions in the presence of mercuric acetate for a time sufficient to effect appreciable polymerization of the allyl acetate.

3. A process for the production of a polymer of a mono-olefinic ester of a monocarboxylic acid and a monohydric alcohol having an olefinic linkage between two carbon atoms one of which contains at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, which consists of heating said ester in liquid phase under anhydrous and non-oxidizing conditions at a temperature of 50° C. to 150° C. in the presence of a neutral saturated carboxylic acid salt of a bivalent metal from the group consisting of cadmium and mercury, said saturated carboxylic acid containing no other elements than carbon, hydrogen, oxygen and halogen, and said heating being continued for a time sufficient to effect appreciable polymerization of said ester.

4. A process for the production of a polymer of a mono-olefinic ester of a monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, which consists of heating said ester in liquid phase under anhydrous and non-oxidizing conditions at a temperature of 50° C. to 150° C. in the presence of a neutral saturated carboxylic acid salt of a bivalent metal from the group consisting of cadmium and mercury, said saturated carboxylic acid containing no other elements than carbon, hydrogen, oxygen and halogen, and said heating being continued for a time sufficient to effect appreciable polymerization of said ester.

5. A process for the production of a polymer of an allyl ester of a saturated monocarboxylic acid, which ester contains not more than 7 carbon atoms, which consists of heating said ester in liquid phase under anhydrous and non-oxidizing conditions at a temperature of 50° C. to 150° C. in the presence of a neutral saturated carboxylic acid salt of a bivalent metal from the group consisting of cadmium and mercury, said saturated carboxylic acid containing no other elements than carbon, hydrogen, oxygen and halogen, and said heating being continued for a time sufficient to effect appreciable polymerization of said ester.

6. A process for the production of a polymer of a mono-olefinic ester of a monocarboxylic acid and a monohydric alcohol having an olefinic linkage between two carbon atoms one of which contains at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, which consists of heating said ester in liquid phase under anhydrous and non-oxidizing conditions at a temperature of 50° C. to 150° C. in the presence of a neutral cadmium salt of a saturated carboxylic acid containing not more than 6 carbon atoms and no other elements than carbon, hydrogen, oxygen and halogen, and said heating being continued for a time sufficient to effect appreciable polymerization of said ester.

7. A process for the production of a polymer of a mono-olefinic ester of a monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, which consists of heating said ester in liquid phase under anhydrous and non-oxidizing conditions at a temperature of 50° C. to 150° C. in the presence of a neutral cadmium salt of a saturated carboxylic acid containing not more than 6 carbon atoms and no other elements than carbon, hydrogen, oxygen and halogen, and said heating being continued for a time sufficient to effect appreciable polymerization of said ester.

8. A process for the production of a polymer of an allyl ester of a saturated monocarboxylic acid, which ester contains not more than 7 carbon atoms, which consists of heating said ester in liquid phase under anhydrous and non-oxidizing conditions at a temperature of 50° C. to 150° C. in the presence of a neutral cadmium salt of a saturated carboxylic acid containing not more than 6 carbon atoms and no other elements than carbon, hydrogen, oxygen and halogen, and said heating being continued for a time sufficient to effect appreciable polymerization of said ester.

9. A process for the production of polyallyl acetate which consists of heating allyl acetate under anhydrous and non-oxidizing conditions at a temperature of 50° C. to 150° C. in the presence of a neutral cadmium salt of a saturated carboxylic acid containing not more than 6 carbon atoms and no other elements than carbon, hydrogen, oxygen and halogen, and said heating being continued for a time sufficient to effect appreciable polymerization of the allyl acetate.

10. A process for the production of polymer which consists of heating in liquid phase a mono-olefinic ester of a saturated monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, said heating being effected under anhydrous and non-oxidizing conditions at a temperature of 50 to 150° C. with the ester in the presence of cadmium acetate for a time sufficient to effect appreciable polymerization of said ester.

11. A process for the production of polymer which consists of heating in liquid phase a mono-olefinic ester of a saturated monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and halogen, said heating being effected under anhydrous and non-oxidizing conditions at a temperature of 50 to 150° C. with the ester in the presence of mercuric acetate for a time sufficient to effect appreciable polymerization of said ester.

12. A process for the production of a polymer of a mono-olefinic ester of a monocarboxylic acid and a monohydric alcohol having an olefinic linkage between two carbon atoms one of which contains at least one hydrogen atom linked directly thereto and the other of which is linked directly to a saturated carbon atom having the hydroxyl group linked directly thereto, which ester contains only double-bonded unsaturation and no other elements than carbon, hydrogen, oxygen and halogen, which consists of heating said ester in liquid phase under anhydrous and non-oxidizing conditions at a temperature of 50° C. to 150° C. in the presence of a neutral mercuric salt of a saturated carboxylic acid containing not more than six carbon atoms and no other elements than carbon, hydrogen, oxygen and halogen, and said heating being continued for a time sufficient to effect appreciable polymerization of said ester.

13. A process for the production of a polymer of a mono-olefinic monocarboxylic acid and a monohydric alcohol having a vinylidene group directly linked to a saturated carbon atom containing the hydroxyl group linked directly thereto, which ester contains only double-bonded unsaturation and no other elements than carbon, hydrogen, oxygen and hydrogen, which consists of heating said ester in liquid phase under anhydrous and non-oxidizing conditions at a temperature of 50° C. to 150° C. in the presence of a neutral mercuric salt of a saturated carboxylic acid containing not more than six carbon atoms and no other elements than carbon, hydrogen, oxygen and halogen, and said heating being continued for a time sufficient to effect appreciable polymerization of said ester.

14. A process for the production of an allyl ester of a saturated monocarboxylic acid, which ester contains not more than seven carbon atoms, which consists of heating said ester in liquid phase under anhydrous and non-oxidizing conditions at a temperature of 50° C. to 150° C. in the presence of a neutral mercuric salt of a saturated carboxylic acid containing not more than six carbon atoms and no other elements than carbon, hydrogen, oxygen and halogen, and said heating being continued for a time sufficient to effect appreciable polymerization of said ester.

15. A process for the production of polyallyl acetate which consists of heating allyl acetate under anhydrous and non-oxidizing conditions at a temperature of 50° C. to 150° C. in the presence of a neutral mercuric salt of a saturated carboxylic acid containing not more than six carbon atoms and no other elements than carbon, hydrogen, oxygen and halogen, and said heating being continued for a time sufficient to effect appreciable polymerization of the allyl acetate.

DAVID E. ADELSON.
HAROLD F. GRAY, Jr.
ROBERT P. RUH.